United States Patent
Zeiler et al.

(10) Patent No.: US 11,245,968 B2
(45) Date of Patent: *Feb. 8, 2022

(54) PREDICTION MODEL TRAINING VIA LIVE STREAM CONCEPT ASSOCIATION

(71) Applicant: Clarifai, Inc., New York, NY (US)

(72) Inventors: Matthew D. Zeiler, New York, NY (US); Daniel Kantor, New York, NY (US)

(73) Assignee: CLARIFAI, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/016,457

(22) Filed: Sep. 10, 2020

(65) Prior Publication Data

US 2020/0413156 A1 Dec. 31, 2020

Related U.S. Application Data

(63) Continuation of application No. 15/986,239, filed on May 22, 2018, now Pat. No. 10,779,060, which is a continuation of application No. 15/717,114, filed on Sep. 27, 2017, now Pat. No. 10,051,344.

(Continued)

(51) Int. Cl.
*H04N 21/84* (2011.01)
*H04N 21/2187* (2011.01)
(Continued)

(52) U.S. Cl.
CPC ........... *H04N 21/84* (2013.01); *G06K 9/6254* (2013.01); *G06K 9/6269* (2013.01);
(Continued)

(58) Field of Classification Search
None
See application file for complete search history.

(56) References Cited

U.S. PATENT DOCUMENTS 8,543,622 B2 9/2013 Giblin
9,332,315 B2 5/2016 Agrawal
(Continued)

OTHER PUBLICATIONS

Notice of Allowance issued in corresponding U.S. Appl. No. 15/717,114 dated Apr. 13, 2018.
(Continued)

*Primary Examiner* — Ricky Chin
(74) *Attorney, Agent, or Firm* — Buckley, Maschoff & Talwalkar LLC

(57) ABSTRACT

In certain embodiments, training of a neural network or other prediction model may be facilitated via live stream concept association. In some embodiments, a live video stream may be loaded on a user interface for presentation to a user. A user selection related to a frame of the live video stream may be received via the user interface during the presentation of the live video stream on the user interface, where the user selection indicates a presence of a concept in the frame of the live video stream. In response to the user selection related to the frame, an association of at least a portion of the frame of the live video stream and the concept may be generated, and the neural network or other prediction model may be trained based on the association of at least the portion of the frame with the concept.

20 Claims, 5 Drawing Sheets

Related U.S. Application Data

(60) Provisional application No. 62/400,538, filed on Sep. 27, 2016.

(51) Int. Cl.

| | | |
|---|---|---|
| H04N 21/482 | (2011.01) | |
| H04N 21/431 | (2011.01) | |
| H04N 21/4223 | (2011.01) | |
| H04N 21/466 | (2011.01) | |
| H04N 21/278 | (2011.01) | |
| H04N 21/266 | (2011.01) | |
| H04N 21/44 | (2011.01) | |
| H04N 21/80 | (2011.01) | |
| H04N 21/422 | (2011.01) | |
| H04N 21/81 | (2011.01) | |
| H04N 21/231 | (2011.01) | |
| H04N 21/234 | (2011.01) | |
| G06K 9/62 | (2006.01) | |

(52) U.S. Cl.
CPC ... *H04N 21/2187* (2013.01); *H04N 21/23109* (2013.01); *H04N 21/23418* (2013.01); *H04N 21/26603* (2013.01); *H04N 21/278* (2013.01); *H04N 21/4223* (2013.01); *H04N 21/42202* (2013.01); *H04N 21/4312* (2013.01); *H04N 21/44008* (2013.01); *H04N 21/466* (2013.01); *H04N 21/4666* (2013.01); *H04N 21/482* (2013.01); *H04N 21/80* (2013.01); *H04N 21/8133* (2013.01)

(56) References Cited

U.S. PATENT DOCUMENTS

| | | | |
|---|---|---|---|
| 9,723,367 B1 | 8/2017 | Long | |
| 10,779,060 B2* | 9/2020 | Zeiler | ............... H04N 21/4666 |
| 2002/0059343 A1 | 5/2002 | Kurishima | |
| 2004/0021685 A1 | 2/2004 | Denoue | |
| 2006/0008251 A1 | 1/2006 | Agrahara | |
| 2008/0187279 A1* | 8/2008 | Gilley | ................... H04N 9/8042 386/250 |
| 2009/0092374 A1* | 4/2009 | Kulas | ................. H04N 21/6125 386/248 |
| 2012/0296739 A1 | 11/2012 | Cassidy | |
| 2013/0117262 A1* | 5/2013 | Lenahan | ............ H04N 21/4126 707/736 |
| 2013/0183022 A1 | 7/2013 | Suzuki | |
| 2013/0216094 A1* | 8/2013 | DeLean | ............... G06K 9/00335 382/103 |
| 2014/0089801 A1 | 3/2014 | Agrawal | |
| 2014/0259056 A1 | 9/2014 | Grusd | |
| 2015/0019461 A1 | 1/2015 | Simard | |
| 2015/0248586 A1 | 9/2015 | Gaidon | |
| 2016/0365121 A1 | 12/2016 | Decarprio | |
| 2017/0039468 A1 | 2/2017 | Zeiler | |
| 2017/0134776 A1 | 5/2017 | Ranjeet | |
| 2017/0154222 A1 | 6/2017 | Zakaluk | |
| 2017/0161391 A1 | 6/2017 | Li | |
| 2017/0251261 A1 | 8/2017 | James | |
| 2017/0280198 A1 | 9/2017 | Krishnamoorthy | |
| 2018/0014090 A1 | 1/2018 | Venkatraman | |
| 2018/0053530 A1 | 2/2018 | Moore | |
| 2018/0139458 A1 | 5/2018 | Wang | |
| 2018/0176661 A1 | 6/2018 | Varndell | |
| 2019/0258847 A1 | 8/2019 | Begeja | |
| 2019/0289372 A1 | 9/2019 | Merler | |
| 2020/0250394 A1* | 8/2020 | Cervelli | ................ G06K 9/0063 |

OTHER PUBLICATIONS

Notice of Allowance issued in corresponding U.S. Appl. No. 15/986,239 dated May 13, 2020.

* cited by examiner

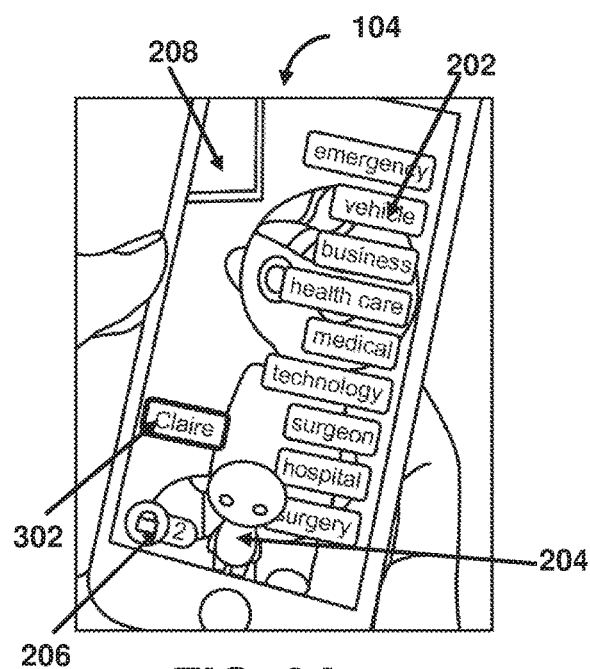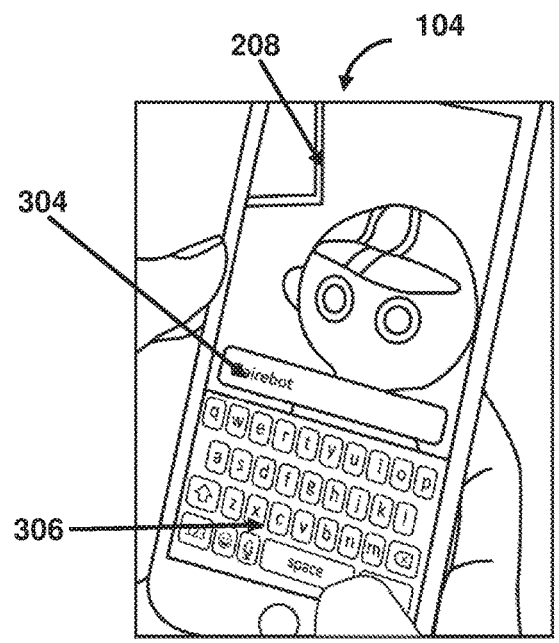
FIG. 3A　　　　　　　　FIG. 3B
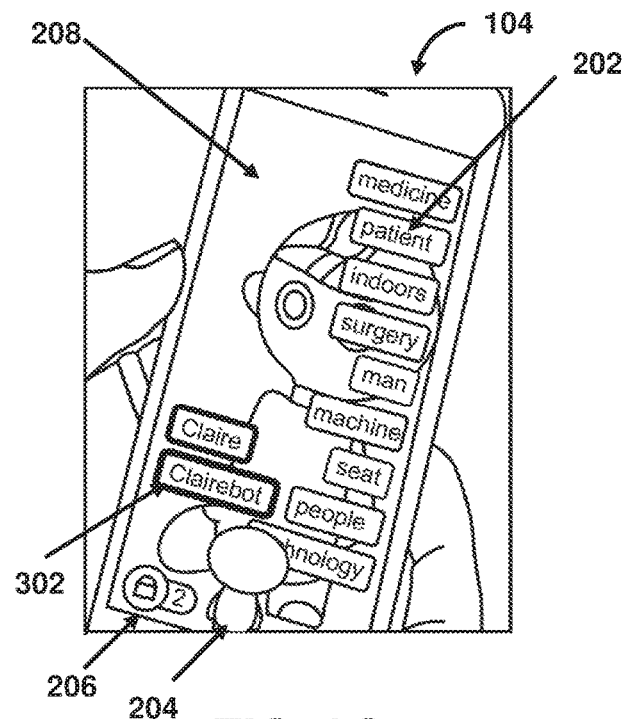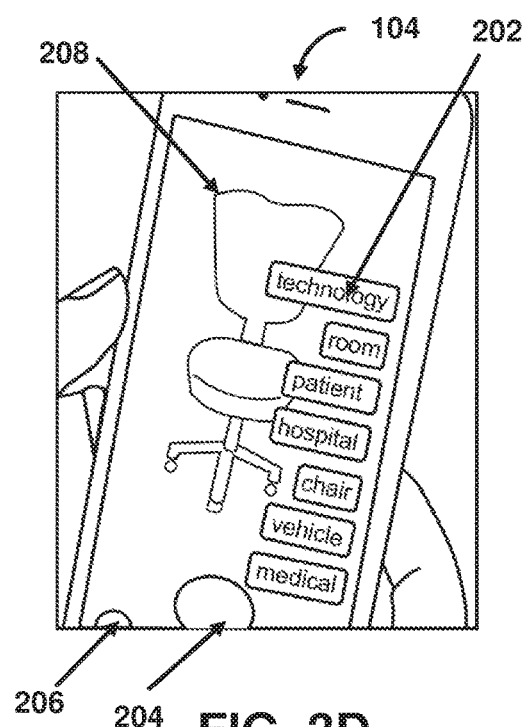
FIG. 3C　　　　　　　　FIG. 3D

PREDICTION MODEL TRAINING VIA LIVE STREAM CONCEPT ASSOCIATION

RELATED APPLICATIONS

This application is a Continuation Application of U.S. Ser. No. 15/986,239, filed May 22, 2018, which is a Continuation Application of U.S. Ser. No. 15/717,114, filed Sep. 27, 2017, entitled "Prediction Model Training Via Live Stream Concept Association", which claims the benefit of U.S. Provisional Patent Application Ser. No. 62/400,538, filed on Sep. 27, 2016, entitled "Systems and Methods for Providing Artificial Intelligence for Internet-of-Things". The subject matter of each application is incorporated herein by reference in entirety.

FIELD OF THE INVENTION

The invention relates to training of prediction models, including, for example, training of a neural network or other recognition models to predict a concept related to a live video stream or other data stream.

BACKGROUND OF THE INVENTION

In recent years, the field of artificial intelligence and machine learning has experienced a resurgence due to advances in performance of computer hardware, sizes of training sets, theoretical understanding of artificial intelligence, and other advances. This resurgence has enabled many advances in other technical fields, including recognition or other prediction systems. Existing methods of training artificial intelligence models typically require a time-consuming and expensive process of collecting data to train such models. In many cases, for example, several workers are hired to provide inputs and feedback to an artificial intelligence model to train the model. These and other drawbacks exist.

SUMMARY OF THE INVENTION

Aspects of the invention relate to methods, apparatuses, and/or systems for training a prediction model via live stream concept association.

One aspect of the disclosure relates to a system for training a prediction model (for example, a neural network or other recognition model) via live stream concept association. In some embodiments, the system comprises a computer system that comprises one or more processors and/or other components. The one or more processors are programmed with computer program instructions to cause the computer system to: receive, via a user interface, at least a portion of a live video stream, the user interface loading the live video stream on the user interface for presentation to a user; receive, via the user interface, a user selection related to a frame of the live video stream during the presentation of the live video stream on the user interface, the user selection indicating a presence of a concept in the frame of the live video stream; and determine an association of at least a portion of the frame of the live video stream with the concept responsive to the user selection related to the frame, wherein the prediction model is trained based on the association of at least the portion of the frame with the concept.

Another aspect of the disclosure relates to a method for training a prediction model via live stream concept association. In some embodiments, the method is implemented by a computer system that comprises one or more processors executing computer program instructions. The computer program instructions, when executed, perform the method comprising: receiving, via a user interface, at least a portion of a live video stream, the user interface loading the live video stream on the user interface for presentation to a user; receiving, via the user interface, a user selection related to a frame of the live video stream during the presentation of the live video stream on the user interface, the user selection indicating a presence of a concept in the frame of the live video stream; and determining an association of at least a portion of the frame of the live video stream with the concept responsive to the user selection related to the frame, wherein the prediction model is trained based on the association of at least the portion of the frame with the concept.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIGS. 3A to 3D illustrate the display of one or more high-confidence predicted concepts relating to a live video stream displayed on a user interface of a client device, in accordance with one or more embodiments.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are illustrated in block diagram form in order to avoid unnecessarily obscuring the embodiments of the invention.

Figure 1:
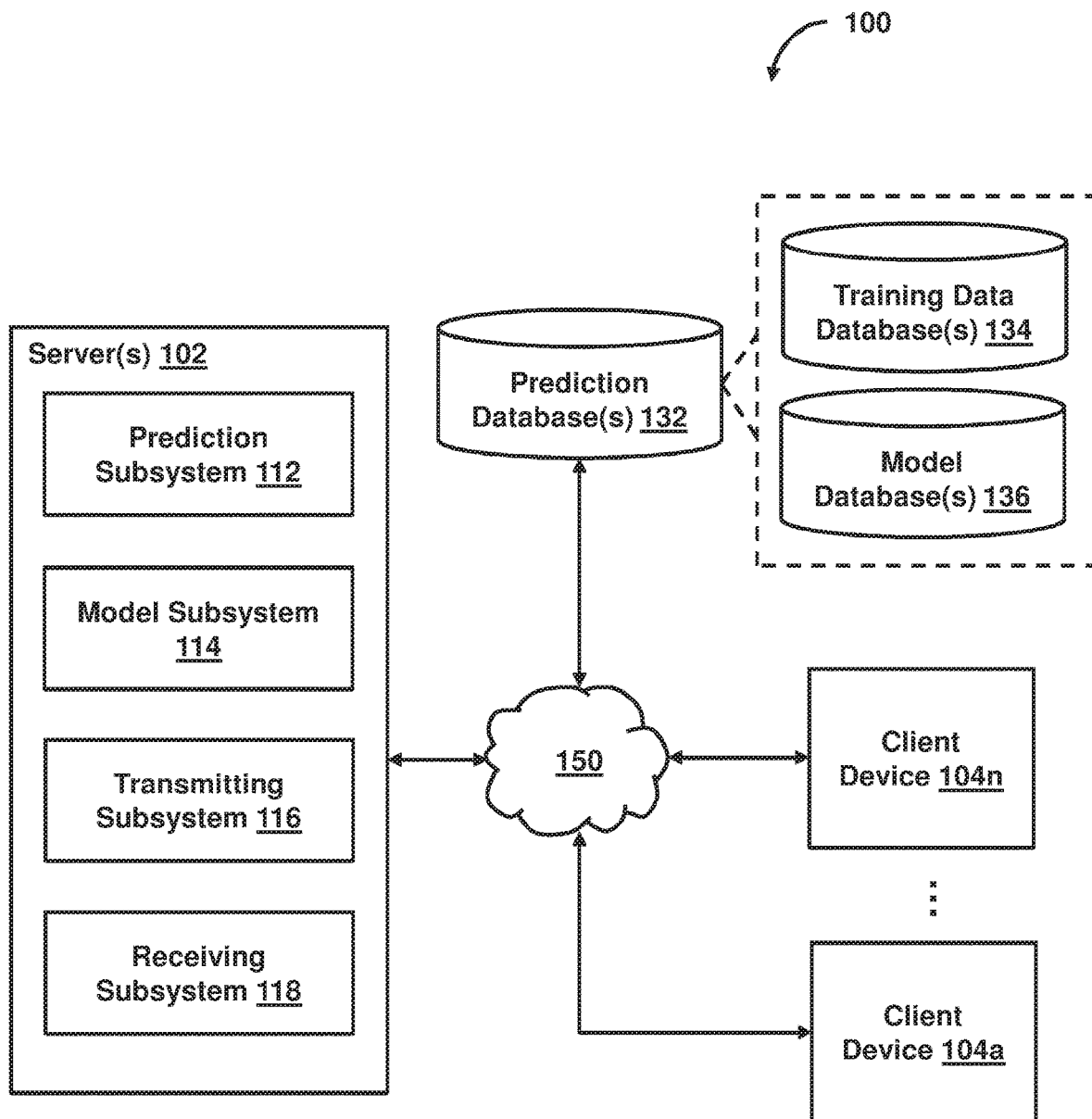
FIG. 1 illustrates a system for facilitating training of recognition or other prediction models, in accordance with one or more embodiments.

FIG. 1 illustrates a system 100 for facilitating training of recognition or other prediction models, in accordance with one or more embodiments. As illustrated in FIG. 1, system 100 may include server(s) 102, client device 104 (or client devices 104a-104n), or other components (for example, any internet of things type of devices). Server 102 may include a prediction subsystem 112, a model subsystem 114, a transmitting subsystem 116, a receiving subsystem 118, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, or other components of system 100. It should be noted that, while one or more operations are described herein as being performed by particular components of server 102, those operations may, in some embodiments, be performed by other components of server 102 or other components of system 100. As an example, while one or more operations are described herein as being performed by components of server 102, those operations may, in some embodiments, be performed by components of client device 104. Further, although the prediction database 132 is illustrated as being separate from the server 102 and the client device 104, the prediction database 132 may be located within the client device 104 and/or server 102. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments). In some embodiments, techniques used by the machine learning models (or other prediction models) include clustering, principal component analysis, nearest neighbors, and other techniques. Training of machine learning models (or other prediction models) may include supervised or unsupervised training.

Model Training Based on User Selection/Feedback/Input

In some embodiments, system 100 may facilitate training of a prediction model to predict concepts related to one or more content items. As an example, concepts may include "dog," "tree," "person," "chair," "table," "patterns," current states (e.g., indicating that a door is closed, a room is messy, a construction site is safe, or other states), or other concept identifiable in an image, video, audio, text, or any other types of data.

In some embodiments, a neural network may be trained and utilized for predicting concepts. As an example, neural networks may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections can be enforcing or inhibitory in their effect on the activation state of connected neural units. In some embodiments, each individual neural unit may have a summation function which combines the values of all its inputs together. In some embodiments, each connection (or the neural unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "front" neural units. In some embodiments, stimulation and inhibition for neural networks may be more free-flowing, with connections interacting in a more chaotic and complex fashion.

In some embodiments, system 100 may determine associations between data items and concepts, which may be used to train one or more prediction models. As an example, system 100 may provide the associations to the prediction models to cause the prediction models to be trained based on the associations. In some embodiments, the data items may be provided via a user interface for presentation to a user. As an example, the user interface may include a user interface of an application hosted at a client device of the user, a user interface of a web application with which the user is interacting, or other user interface. System 100 may receive, via the user interface, one or more user inputs indicating one or more concepts as being related to the data items (e.g., a user input indicating presence of the concepts in the data items, a user input indicating that the concepts are complimentary or substitutes to concepts in the data items, a user input indicating that the concepts should added to the data items, etc.). Based on the user inputs, system 100 may generate associations between the data items and the concepts, and provide the generated associations to the prediction models to cause the prediction models to be trained based on the generated associations.

In some embodiments, system 100 may receive, via a user interface, one or more portions of a data stream loaded at the user interface for presentation to a user. Responsive to receipt of a user input related to a given portion of the data stream (e.g., a user input indicating the presence of a concept in the given portion of the data stream or other user input received during the presentation of the data stream), system 100 may determine an association of the given portion (or the data stream as a whole) with the concept. System 100 may cause a prediction model to be trained based on the association of the given portion (or the data stream) with the concept. As an example, the data stream may include a live video stream, a live audio stream, a live text stream, or other live or non-live data stream. In one use case, where the data stream includes a live video stream, system 100 may receive one or more user inputs related to one or more portions of the live video stream via the user interface during the presentation of the live video stream on the user interface. If, for example, the user inputs indicate the presence of a concept respectively in the portions of the live video stream, system 100 may cause at least the portions of the live video stream to be respectively associated with the concept (e.g., frames or portions thereof selected by a user, areas of the frames corresponding to locations of the user interface tapped, pressed, or otherwise selected by the user, etc.). These associations may subsequently be used to train the prediction model (e.g., by providing at least the portions of live video frame as a reference input and the concept as a reference output to the prediction model to cause the prediction model to be trained on the reference input/output or via other training techniques).

For example, in some embodiments, the receiving subsystem 118 may receive data from the client device 104 via a network 150, and a prediction subsystem 112 may predict one or more concepts as concepts that are related to the data received from the client device 104. The prediction subsystem 112 may predict one or more concepts related to the data based on data stored in a training data database 134. In other words, the prediction subsystem 112 may predict one or more concepts related to the data by comparing the received data (i.e., received from the client device 104) to the data stored in a training data database 134. Additionally, or alternatively, the prediction subsystem 112 may predict one or more concepts related to the data based on one or more outputs produced by the model subsystem 114 that processes the data via a prediction model. Specifically, in response to the data received from the client 104, the receiving subsystem 118 may transmit the data to the model subsystem 114, the model subsystem 114 may retrieve a prediction model from the model database 136 based on a type of data received from the client device 104, and the model subsystem 114 may process the data via the prediction model to generate one or more outputs. These outputs may be used by the prediction subsystem 112 to predict one or more concepts related to the data received from the client device 104. Once the one or more concepts related to the data are predicted by the prediction subsystem 112, the one or more concepts related to the data are transmitted to the client device 104 by the transmitting subsystem 116 via the network 150 for display via a user interface of the client device 104. The concepts may also be predicted using other methods. For example, the concepts may be predicted based on the user's location (for example, the location of the client device 104 of the user), the user's browsing history, the user's previous selection of concepts, or any other method that may use information corresponding to the user and the client device 104 of the user. The prediction database 132 (for example, the training data database 134) may be updated based on the predicted one or more concepts related to the data.

In some embodiments, the one or more predicted concepts related to the data may be displayed to the user of the client device 104 via the user interface. Some predicted concepts related to the data may be displayed on the client device 104 with an indication of higher confidence than other predicted concepts. In response to the display of one or more concepts related to the data, the user of the client device 104 may select one or more concepts related to the data that the user believes is an accurate description of the data. In response to the selection of one or more concepts related to the data by the user of the client device 104, the client device 104 may generate an association between the selected one or more concepts and the data, and may transmit the generated association to the server 102. Alternatively, the client device 104 may transmit the selected one or more concepts related to the data to the server 102, and the server 102 may generate an association between the selected one or more concepts and the data. Also, the user may input a concept (for example, a user may input a concept distinct from the one or more predicted concepts displayed on the client device 104 using a keyboard of the client device 104) related to the data via the client device 104, and the client device 104 (or the server 102) may generate an association between the user input concept and the data. The prediction database 132 (for example, the training data database 134) may be updated based on the generated association.

In some embodiments, in response to the generated association, the model subsystem 114 may retrieve a prediction model (based on the type of data related to one or more concepts received from the client device 104), and process, via the prediction model, the generated association to train the prediction model to make future predictions relating to other data. The prediction database 132 (for example, the model database 136) may be updated to reflect the trained prediction model.

The trained prediction model may be deployed to other client devices (or servers) via network 150 or another network so that these other client devices (or servers) may process, via the trained prediction model, new data to make predictions relating to the new data. This would allow the trained prediction model to be leveraged on any internet of things type of devices.

User Interface of Client Device

Figure 2A:
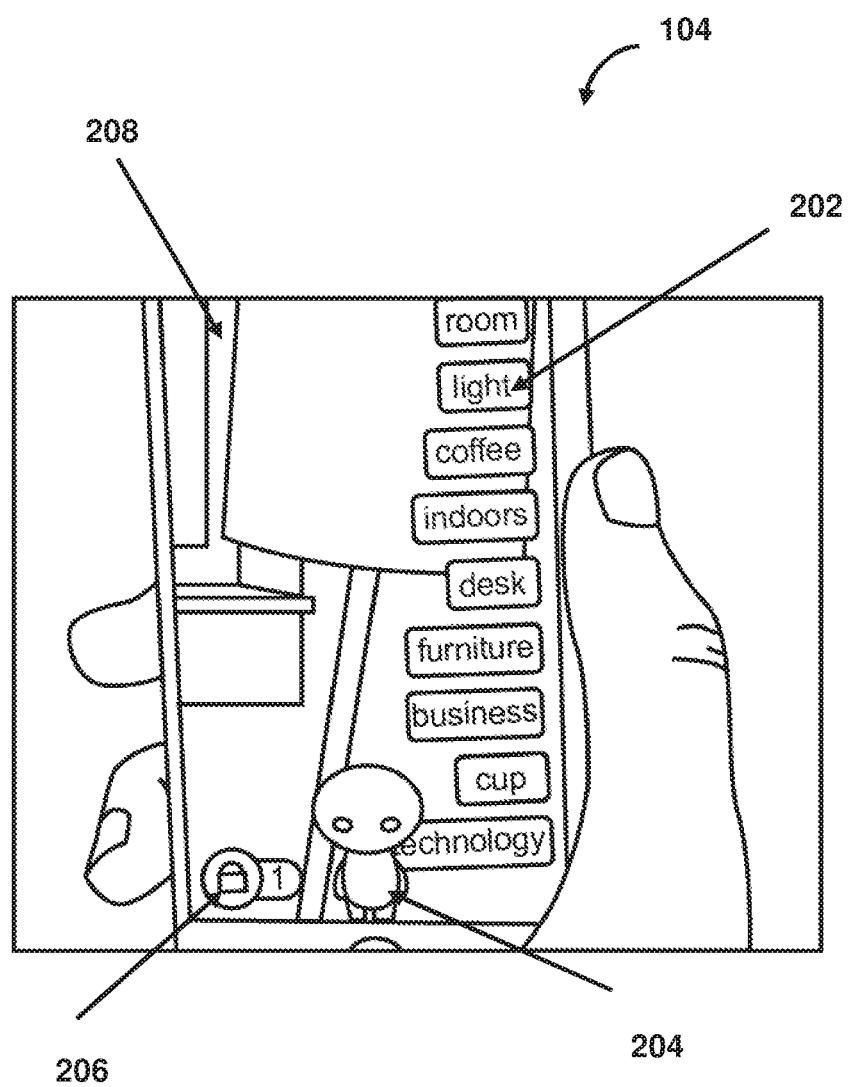
FIGS. 2A and 2B illustrate the display of one or more predicted concepts relating to a live video stream displayed on a user interface of a client device, in accordance with one or more embodiments.
Figure 2B:
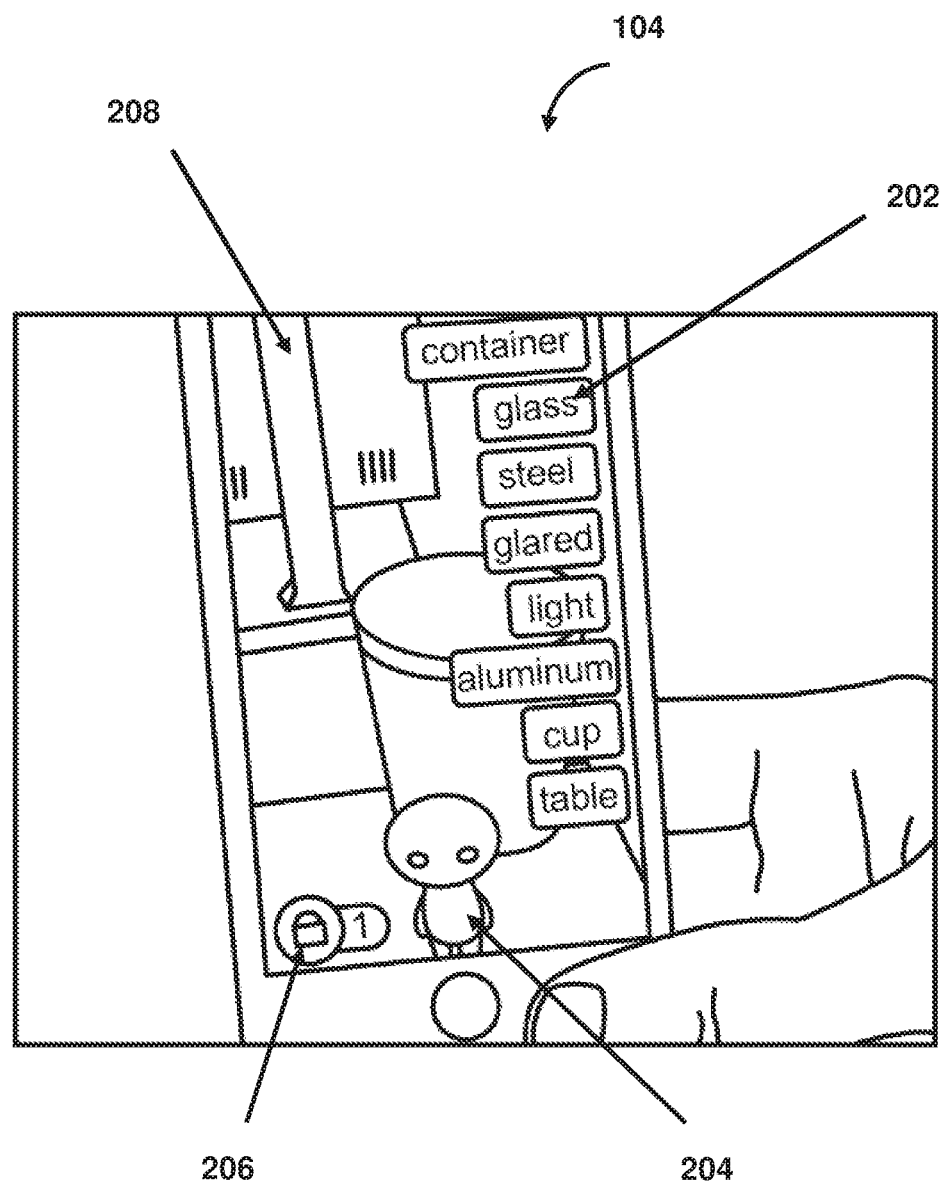

Next, as an example, FIGS. 2A and 2B illustrate the display of one or more predicted concepts 202 (via a plurality of displayed buttons) relating to the live video stream 208 displayed on a user interface of the client device 104. Although the examples illustrated in FIGS. 2A and 2B correspond to a live video stream, it should be understood that any type of data, such as audio, image, video, text, bytes of data, etc. may be used instead of the live video stream. In some embodiments, a camera of the client device 104 may be used to capture the live video stream 208, and one or more predicted concepts 202 relating to the live video stream 208 may be displayed on the user interface of the client device 104. In other embodiments, another camera (remote from the client device 104) may be used to capture the live video stream 208, and the client device 104 may be used to display the live video stream 208 received from the remote camera (either via a wired or wireless connection with the client device 104) along with the one or more predicted concepts 202 that relate to the live video stream 208.

In the example illustrated in FIG. 2A, a camera (not shown) of the client device 104 (for example, a cell phone) may be used to capture the live video stream 208. In response to the captured live video stream 208, a plurality of predicted concepts 202 relating to the live video stream 208 are displayed over the live video stream 208. As noted above, the plurality of predicted concepts 202 may be predicted by the prediction subsystem 112 based on a comparison of the live video stream 208 to the data stored in a training data database 134 and/or based on one or more outputs produced by the model subsystem 114 that processes the live video stream 208 via a prediction model, and/or based on the user's location (for example, the location of the client device 104 of the user), the user's browsing history, the user's previous selection of concepts, or any other method that may use information corresponding to the user and the client device 104 of the user.

In this example in FIG. 2A, some of the plurality of predicted concepts 202 (relating to a current frame of the live video stream 208) that are displayed on a user interface of the client device 104 include "room," "light," "indoors," "furniture," and "technology." The user may select any of these displayed concepts 202 that the user believes relates to a current frame of the live video stream 208. For example, if the user believes that the current frame of the live video stream 208 in FIG. 2A is related to light, the user may select (via a touch selection, voice command, visual instruction such as nodding or blinking when using Augmented Reality of Virtual Reality devices, a motion of the client device, or any other method that conveys a selection) "light" as the concept related to the current frame of the live video stream 208. Such a user selection indicates that the concept "light" is present in the current frame of the live video stream 208. Based on this user selection, an association between the current frame of the live video stream 208 and the concept "light" is generated (for example, the current frame of the live video stream 208 may be annotated with the concept "light") by the client device 104 and the generated association between the current frame of the live video stream 208 and the concept "light" may be temporarily stored in a memory (not shown) of the client device 104 and transmitted to the server 102 to train a prediction model. Alternatively, as noted above, the user selection may be transmitted to the server 102 so that the server 102 may generate the association between the current frame of the live video stream 208 and the concept "light." The generated association between the current frame and the concept "light" may be processed, via a prediction model, by the server 102 (for example, by the model subsystem 114) to train the prediction model to make future predictions relating to other live video streams and other frames of the current live video stream 208.

Additionally, or alternatively, the user may select a concept (for example, "light" in FIG. 2A) from the user interface and slide a button corresponding to the concept "light" to a portion of the current frame of the live video stream 208 that is related to the concept "light." For example, in FIG. 2A, a user may slide the button corresponding to the concept "light" on top of an object (for example, a lamp in FIG. 2A) displayed in the current frame of the live video stream 208 in order to label the object as "light." Such a user selection indicates that the concept "light" is present in the portion of the current frame of the live video stream 208. Based on such a user selection, the client device 104 generates an association between the portion of the current frame of the live video stream 208 and the concept "light," stores this association temporarily in a memory (not shown) of the client device 104, and transmits this association to the server 102 to train a prediction model. Alternatively, as noted above, the user selection may be transmitted to the server 102 so that the server 102 may generate the association between the current frame of the live video stream 208 and the concept "light." The generated association between the portion of the current frame of the live video stream 208 and the concept "light" may be processed, via a prediction model, by the server 102 (for example, by the model subsystem 114) to train the prediction model to make future predictions relating to other live video streams and other frames of the current live video stream 208.

Additionally, or alternatively, in some embodiments, the user may select a displayed concept 202 by holding down on a button corresponding to the concept for an extended period of time (the extended period of time corresponding to a period of time the user believes that the concept is still present in the live video stream 208). For example, if the current frame of the live video stream 208 in FIG. 2A is related to light, the user may select "light" (for example, the button corresponding to "light") as a positive concept related to the current frame of the live video stream 208 and continue to hold the button corresponding to "light" until, for example, the live video stream 208 continues to display an object that the user believes corresponds to "light." Specifically, in FIG. 2A, the user may continue to hold the button corresponding to "light" until, for example, the live video stream 208 continues to display a lamp, and release the button corresponding to "light" when the lamp is no longer displayed in the live video stream 208. Based on such a user selection, the client device 104 generates a positive association between the frames (of the live video stream 208 that were displayed during the user selection of the button corresponding to the concept) and the concept "light," and a negative association between the frames (of the live video stream 208 that were displayed after the user released the button corresponding to the concept) and the concept "light." Such a user selection indicates that the concept "light" is present in the frames of the live video stream 208 that were displayed during the user selection of the button corresponding to the concept and absent in the other frames of the live video stream 208 that were displayed after the user released the button corresponding to the concept.

The generated positive and negative associations may be temporality stored in a memory (not shown) of the client device 104, and transmitted to the server 102 to train a prediction model. Alternatively, as noted above, the user selection may be transmitted to the server 102 so that the server 102 may generate the positive and negative associations. The generated positive and negative associations between the frames of the live video stream 208 and the concept "light" may be processed, via a prediction model, by the server 102 (for example, by the model subsystem 114) to train the prediction model to make future predictions relating to other live video streams and other frames of the current live video stream 208.

Similarly, if the user slides the button corresponding to a concept over a portion of the frame of the live video stream 208 and holds the button for an extended period of time over portions of the frames of the live video stream 208, positive and negative associations are generated. That is, the client device 104 generates a positive association between the portions of the frames (of the live video stream 208 that were displayed during the user selection of the button corresponding to the concept and over which the button corresponding to the concept was held) and the concept "light," and a negative association between the frames (of the live video stream 208 that were displayed after the user released the button corresponding to the concept) and the concept "light." Such a user selection indicates that the concept "light" is present in the portions of the frames (of the live video stream 208 that were displayed during the user selection of the button corresponding to the concept and over which the button corresponding to the concept was held) and absent in the other frames (of the live video stream 208 that were displayed after the user released the button corresponding to the concept).

The generated positive and negative associations may be temporality stored in a memory (not shown) of the client device 104, and transmitted to the server 102 to train a prediction model. Alternatively, as noted above, the user selection may be transmitted to the server 102 so that the server 102 may generate the positive and negative associations. The generated positive and negative associations between the frames of the live video stream 208 and the concept "light" may be processed, via a prediction model, by the server 102 (for example, by the model subsystem 114) to train the prediction model to make future predictions relating to other live video streams and other frames of the current live video stream 208.

Additionally, in some embodiments, the user interface may include other buttons 204 and 206. The selection of the button 204 allows a user to enter a concept relating the current frame of the live video stream 208 (see FIG. 3B) or additional metadata related to the selected concept. For instance, the button 204 may be selected to enter additional metadata (for example, night lamp, desk lamp, etc.) related to the concept "light." Entering additional metadata allows the user to further describe the selected concept, thereby providing additional information for training a prediction model. The entering of additional metadata relating to a concept generates an association between the current frame of the live video stream 208, the selected concept, and the entered metadata. This generated association between the current frame, the selected concept, and the metadata may be processed, via a prediction model, by the server 102 (for example, by the model subsystem 114) to train the prediction model to make future predictions relating to other live video streams and other frames of the current live video stream 208. The button 206 may provide functionalities other than the ones provided by buttons 202 and 204. For example, button 206 may allow the user to view a menu option listing several functionalities that the user can select, view messages received by the user of the user device from other users of different user devices, or send messages to other users, the messages including information regarding concepts and data (for example, a live video stream) related to the concepts.

Additionally, in some embodiments, the client device 104 may determine a pressure level applied to the user interface of the client device 104 when the user selects one or more of the displayed concepts 202 from the user interface of the client device 104. Based on the determined pressure level, a confidence value may be generated by the client device 104 (or the server 102). The confidence value corresponds to the confidence level regarding the presence of the selected concept in the live video stream 208. For example, the harder the user presses the user interface to select a concept, the higher the confidence level regarding the presence of the selected concept in the live video stream 208. The determined pressure level and generated confidence value (or level) may be processed, via a prediction model, by the server 102 (for example, by the model subsystem 114) to train the prediction model to make future predictions relating to other live video streams and other frames of the current live video stream 208.

Also, the user interface of the client device 104 may receive voice commands to change the displayed concepts and to select a particular concept relating a frame of the live video stream 208. For example, the user may provide a voice command "update concepts" or "concepts do not relate to video," and the client device 104 may generate a negative association between the frames of the live video stream 208 and the displayed concepts 202 based on such voice commands. Alternatively, as noted above, the voice command may be transmitted to the server 102 so that the server 102 may generate the negative association. The generated negative association between the frames and the displayed concepts (based on voice commands) may be processed, via a prediction model, by the server 102 (for example, by the model subsystem 114) to train the prediction model to make future predictions relating to other live video streams and other frames of the current live video stream 208.

Further, the voice commands may also be used to select a particular concept relating a frame of the live video stream 208. For example, the user may provide a voice command "add new concept—lamp" to generate an association between the new concept "lamp" and the current frame of the live video stream 208, or provide a voice command "select light" to select "light" as the concept and to generate an association between the concept "light" and the current frame of the live video stream. The generated association between the current frame and the concept (based on voice commands) may be processed, via a prediction model, by the server 102 (for example, by the model subsystem 114) to train the prediction model to make future predictions relating to other live video streams and other frames of the current live video stream 208.

Further, in some embodiments, the plurality of predicted concepts 202 being displayed on the user interface of the client device 104 may be continuously changed and updated. For example, the plurality of predicted concepts 202 may scroll from the bottom of the user interface of the client device 104 to the top of the user interface of the client device 104 at a predetermined speed (which the user may change to the user's liking), thereby allowing additional predicted concepts 202 to be displayed on the user interface of the client device 104. In other words, although the concept "cup" is displayed at the bottom of the user interface in FIG. 2A, the concept "cup" may be made to continuously scroll towards the top (along with the other displayed concepts) of the user interface, thereby allowing additional predicted concepts 202 to be displayed on the user interface. By allowing a continuous change and update to the plurality of predicted concepts 202 that are displayed on the user interface of the client device 104, the user of the client device 104 is not restricted to a select few concepts and is also not bombarded with an excess amount of concepts that may take up a large portion of the user interface.

Alternatively, in some embodiments, the plurality of predicted concepts 202 displayed on the user interface of the client device 104 may be continuously changed and updated in a number of other ways. For example, a first set of the plurality of predicted concepts 202 may be displayed for a predetermined amount time (for example, 1 second, 2 seconds, 5 seconds, 7 seconds, etc.) and a second set of the plurality of predicted concepts 202 may be made to replace the first set after the predetermined amount of time has elapsed, thereby continuously changing and updating the plurality of predicted concepts 202 that are displayed on the user interface. Also, for example, the plurality of predicted concepts 202 may be made to scroll from top to bottom, right to left, left to right, bottom to top, or diagonally across the user interface, thereby continuously changing and updating the plurality of predicted concepts 202 that are displayed on the user interface.

Further, in some embodiments, the button 204 may be used to rewind the live video stream 208 in order to allow a user to supplement or modify a previously selected concept relating to a frame and/or to select a concept relating to a frame. Modifying the concept for a frame and/or selecting a concept relating to a frame may generate new associations between a frame and the concept. These new generated associations between the frames and the concept may be processed, via a prediction model, by the server 102 (for example, by the model subsystem 114) to train the prediction model to make future predictions relating to other live video streams and other frames of the current live video stream 208.

After modifying the previously selected concept relating to a frame and/or selecting a concept relating to a frame, the user may use the button 204 to fast forward to a current frame of the live video stream 208 or play the live video stream 208 from the current point (i.e., a point in the live video stream 208 after the live video stream 208 has been rewound). Although the buttons are illustrated with a particular shape and size in FIGS. 2A and 2B, it is to be understood that any shape and/or size for the buttons may be used for display.

Additionally, although the above examples in FIGS. 2A and 2B have been illustrated to include a plurality of displayed concepts 202 (and buttons corresponding to each of the plurality of concepts) and buttons 204 and 206, in some embodiments, the user interface may include a single button representing a concept. The single button may represent a concept that has either been predicted by the prediction subsystem 112 based on the live video stream 208 (or by any prediction method described above) or entered by a user of the client device 104 (via a touch instruction, voice command, visual instruction, a motion of the client device, or any other method to enter an input). The concept represented by the button may be changed or updated by the prediction subsystem 112 at every predetermined time interval, or may be changed or updated by a user via a user input.

The user may press (or tap/select) the single button if the user believes that the concept represented by the single button relates to a current frame of the live video stream 208. For example, if the user believes that the current frame of the live video stream 208 in FIG. 2A is related to the concept represented by the single button, the user may select (via a touch selection, voice command, visual instruction such as nodding or blinking when using Augmented Reality of Virtual Reality devices, a motion of the client device, or any other method that conveys a selection) the single button during the current frame of the live video stream 208. Such a user selection indicates that the concept represented by the single button is present in the current frame of the live video stream 208. Alternatively, the user may select (or tap) a portion of the current frame of the live video stream 208 that the user believes corresponds to the concept represented by the single button. Such a user selection indicates that the concept represented by the single button is present in the portion of the current frame of the live video stream 208. Based on either user selection, an association between the current frame of the live video stream 208 and the concept represented by the single button (for example, the current frame of the live video stream 208 may be annotated with the concept represented by the single button) may be generated by the client device 104 and the generated association between the current frame of the live video stream 208 and the concept represented by the single button may be temporarily stored in a memory (not shown) of the client device 104 and transmitted to the server 102 to train a prediction model. Alternatively, as noted above, either user selection may be transmitted to the server 102 so that the server 102 may generate the association. The generated association between the current frame and the concept may be processed, via a prediction model, by the server 102 (for example, by the model subsystem 114) to train the prediction model to make future predictions relating to other live video streams and other frames of the current live video stream 208.

Additionally, or alternatively, in some embodiments, the user may select the single button representing the concept from the user interface and slide the single button to a portion of the current frame of the live video stream 208 that is related to the concept. For example, a user may slide the single button on top of an object (for example, a lamp) displayed in the current frame of the live video stream 208 in order to label the object with the concept represented by the single button. Such a user selection indicates that the concept is present in the portion of the current frame of the live video stream 208. Based on such a user selection, the client device 104 generates an association between the portion of the current frame of the live video stream 208 and the concept, stores this association temporarily in a memory (not shown) of the client device 104, and transmits this association to the server 102 to train a prediction model. Alternatively, as noted above, the user selection may be transmitted to the server 102 so that the server 102 may generate the association. The generated association between the portion of the current frame of the live video stream 208 and the concept may be processed, via a prediction model, by the server 102 (for example, by the model subsystem 114) to train the prediction model to make future predictions relating to other live video streams and other frames of the current live video stream 208.

Additionally, or alternatively, in some embodiments, the user may select the concept by holding down on the single button representing the concept for an extended period of time (the extended period of time corresponding to a period of time the user believes that the concept is still present in the live video stream 208). For example, if the current frame of the live video stream 208 in FIG. 2A is related to the concept, the user may select the single button representing the concept and continue to hold the single button representing the concept until, for example, the live video stream 208 continues to display an object that the user believes corresponds to the concept. Specifically, in FIG. 2A, the user may continue to hold the single button representing the concept until, for example, the live video stream 208 continues to display the concept, and release the single button representing the concept when the concept is no longer displayed in the live video stream 208. Alternatively, the user may select (or tap) portions of the frames of the live video stream 208 that the user believes correspond to the concept represented by the single button for an extended period of time (the extended period of time corresponding to the period of time the user believes that the concept is still present in the live video stream 208). Such a user selection indicates that the concept represented by the single button is present in the portions of the frames of the live video stream 208. Based on either user selection, the client device 104 generates a positive association between the frames (of the live video stream 208 that were displayed during the user selection) and the concept, and a negative association between the frames (of the live video stream 208 that were displayed after the user ended the selection) and the concept. Such a user selection indicates that the concept is present in the frames of the live video stream 208 that were displayed during the user selection and absent in the other frames of the live video stream 208 that were displayed after the user ended the selection.

The generated positive and negative associations may be temporality stored in a memory (not shown) of the client device 104, and transmitted to the server 102 to train a prediction model. Alternatively, as noted above, the user selection may be transmitted to the server 102 so that the server 102 may generate the positive and negative associations. The generated positive and negative associations between the frames of the live video stream 208 (including portions of the frames of the live video stream 208) and the concept may be processed, via a prediction model, by the server 102 (for example, by the model subsystem 114) to train the prediction model to make future predictions relating to other live video streams and other frames of the current live video stream 208.

Similarly, if the user slides the single button representing the concept over a portion of a frame of the live video stream 208 and holds the single button for an extended period of time over portions of the frames of the live video stream 208, positive and negative associations are generated. That is, the client device 104 generates a positive association between the portions of the frames (of the live video stream 208 that were displayed during the user selection of the single button representing the concept and over which the single button representing the concept was held) and the concept, and a negative association between the frames (of the live video stream 208 that were displayed after the user released the single button representing the concept) and the concept. Such a user selection indicates that the concept is present in the portions of the frames (of the live video stream 208 that were displayed during the user selection of the single button representing the concept and over which the single button representing the concept was held) and absent in the other frames (of the live video stream 208 that were displayed after the user released the single button representing the concept).

The generated positive and negative associations may be temporality stored in a memory (not shown) of the client device 104, and transmitted to the server 102 to train a prediction model. Alternatively, as noted above, the user selection may be transmitted to the server 102 so that the server 102 may generate the positive and negative associations. The generated positive and negative associations between the frames of the live video stream 208 and the concept may be processed, via a prediction model, by the server 102 (for example, by the model subsystem 114) to train the prediction model to make future predictions relating to other live video streams and other frames of the current live video stream 208.

Additionally, although the above examples have been illustrated to include a plurality of buttons or a single button, the user interface may include no buttons. For example, a first screen of the user interface may be used to enter a concept or select a concept from a plurality of concepts that may have been predicted by the client device 104 or the server 102. The prediction of a concept may be based on previous selections by the user, the user's location (for example, the location of the client device 104 used by the user), browsing history of the user, previous predictions, or any other method that may use information related to the user and/or the client device 104 of the user. Once a concept is selected or input by the user of the client device 104, a subsequent screen is displayed on the user interface that displays the live video stream 208 and that allows a user to simply select (via a touch selection, voice command, visual instruction such as nodding or blinking when using Augmented Reality of Virtual Reality devices, a motion of the client device 104 or any other method that conveys a selection) any portion of the user interface that the user believes corresponds to the concept.

For example, if the user believes that the current frame of the live video stream 208 is related to the concept, the user may select any portion of the live video stream 208 via the user interface of the client device 104. Such a user selection indicates that the concept is present in the current frame of the live video stream 208 and/or the portion of the current frame of the live video stream 208. Based on such a user selection, an association between the current frame of the live video stream 208 and the concept (for example, the current frame of the live video stream 208 may be annotated with the concept) is generated by the client device 104 and the generated association between the current frame of the live video stream 208 and the concept may be temporarily stored in a memory (not shown) of the client device 104 and transmitted to the server 102 to train a prediction model. Alternatively, as noted above, the user selection may be transmitted to the server 102 so that the server 102 may generate the association. The generated association between the current frame and the concept may be processed, via a prediction model, by the server 102 (for example, by the model subsystem 114) to train the prediction model to make future predictions relating to other live video streams and other frames of the current live video stream 208.

Additionally, or alternatively, in some embodiments, the user may select the concept by holding down portions of the frames of the live video stream 208 for an extended period of time via the user interface (the extended period of time corresponding to a period of time the user believes that the concept is still present in the live video stream 208). For example, if the current frame of the live video stream 208 is related to the concept, the user may select portions of the frames of the live video stream 208 via the user interface and continue to hold portions of the frames of the live video stream 208 via the user interface, until, for example, the live video stream 208 continues to display an object that the user believes corresponds to the concept. Specifically, in FIG. 2A, the user may continue to hold portions of the frames of the live video stream 208 via the user interface until, for example, the live video stream 208 continues to display the concept, and release the hold when the concept is no longer displayed in the live video stream 208. Based on the user selection, the client device 104 generates a positive association between the frames (of the live video stream 208 that were displayed during the user selection) and the concept, and a negative association between the frames (of the live video stream 208 that were displayed after the user ended the selection) and the concept. Such a user selection indicates that the concept is present in the frames of the live video stream 208 that were displayed during the user selection and absent in the other frames of the live video stream 208 that were displayed after the user ended the selection.

The generated positive and negative associations may be temporality stored in a memory (not shown) of the client device 104, and transmitted to the server 102 to train a prediction model. Alternatively, as noted above, the user selection may be transmitted to the server 102 so that the server 102 may generate the positive and negative associations. The generated positive and negative associations between the frames of the live video stream 208 (including portions of the frames of the live video stream 208) and the concept may be processed, via a prediction model, by the server 102 (for example, by the model subsystem 114) to train the prediction model to make future predictions relating to other live video streams and other frames of the current live video stream 208.

Although the above examples have been described with the camera being a part of the client device 104, in some embodiments, the camera may be remote from the client device 104. For example, the camera may be a security camera, a drone camera, a cell phone in a holster, an orbiting satellite camera, or any other camera that is remote from the client device 104. The remote camera may supply live video streams to the client device 104 and the above described process to predict concepts and to facilitate training of a prediction model may be carried out in a similar fashion.

Some applications for exemplary implementations include: (a) learning the state of the world—the touch screen of the client device 104 may be used to label some state of the world (such as "door is closed," "room is messy," "construction site is safe," etc.) by pressing a button on the user interface of the client device 104 to label a positive association (for example, "door is closed") between the concept and a first frame of the live video stream 208 and release the button to label a negative association (for example, "door is open") between the concept and a second frame of the live video stream 208. These positive and negative associations may be processed, via a prediction model, by the server 102 (for example, by the model subsystem 114) to train the prediction model to make future predictions relating to other live video streams and other frames of the current live video stream 208; (b) speaker classification during an audio conversation between two people—hold the button on the user interface of the client device 104 to indicate a positive association of the audio with person 1 and release the button on the user interface of the client device 104 to indicate a negative association of the audio with person 1. These positive and negative associations may be processed, via a prediction model, by the server 102 (for example, by the model subsystem 114) to train the prediction model to make future predictions that may recognize the person speaking during an audio conversation; (c) training a person's face—hold the button on the user interface of the client device 104 to indicate a positive association of a frame of the video with person 1 and release the button on the user interface of the client device 104 to indicate a negative association of another frame of the video with person 1. These positive and negative associations may be processed, via a prediction model, by the server 102 (for example, by the model subsystem 114) to train the prediction model to make future predictions to recognize a person's face; (d) selecting different concepts in-between the positive and negative associations in (c) above; (e) web based user interface for labelling data; (f) batch background of machine learning methods; and (g) setting up machine learning methods on a new device to process new data.

FIG. 2B illustrates the display of one or more predicted concepts 202 (via a plurality of displayed buttons) relating to the live video stream 208 displayed on a user interface of the client device 104. FIG. 2B is similar to FIG. 2A, except that a different frame of the live video stream 208 is displayed and therefore, different predicted concepts 202 are also displayed. Buttons 204 and 206 have the same functions as described above.

FIGS. 3A to 3D illustrate the display of one or more high-confidence predicted concepts 302 relating to the live video stream 208 displayed on a user interface of the client device 104.

In FIG. 3A, a user interface including one or more predicted concepts 202, one or more high-confidence predicted concepts 302, and buttons 204 and 206 are illustrated. Since the function of the buttons 204 and 206 are the same as described above, an explanation of the functions of buttons 204 and 206 will not be repeated for the sake of brevity. Further, since the predicted concepts 202 have been described above, an explanation of the details regarding the predicted concepts 202 will also not be repeated for the sake of brevity.

In some embodiments, each predicted concept predicted by the prediction subsystem 112 may be assigned a confidence value that the concept is present in a particular frame of the live video stream 208. When the confidence value of a predicted concept is below a predetermined threshold, the predicted concept is displayed as the predicted concept 202 on the user interface of the client device 104. On the other hand, when the confidence value of the predicted concept is equal to or above the predetermined threshold, the predicted concept is displayed as a high-confidence predicted concept 302 on the user interface of the client device 104. As an example in FIG. 3A, the one or more predicted concepts 202 are displayed on the right side of the user interface, and the high-confidence predicted concept 302 is highlighted and displayed on the bottom left portion of the user interface. Although high-confidence predicted concept 302 is highlighted and displayed on the bottom left portion of the user interface in the example in FIG. 3A, it should be understood that the high-confidence predicted concept 302 may be displayed on any portion of the user interface. In some embodiments, the high-confidence predicted concept 302 may be displayed over a portion of a frame of the live video stream 208 that relates to the high-confidence predicted concept 302. Although the examples in FIGS. 3A-3D illustrate a plurality of buttons, the high-confidence predicted concept 302 can also be displayed in examples where the user interface has only a single button or when the user interface does not have any buttons. Details of the user interface including a single button or no buttons have been described above and therefore, are not repeated for the sake of brevity.

In some embodiments, a concept may be assigned a confidence value (indicating a confidence level that the concept is present in a particular frame of a live video stream) based on a user selection (or user input) of the concept indicating the presence of the concept in a particular frame of a live video stream via the user interface, and/or based on processing, a live video stream, via a prediction model, and/or based on processing a generated association between a concept and a particular frame via a prediction model, and/or based on a pressure level applied by the user on the user interface during a user selection of a concept relating to a frame in the live video stream.

In FIG. 3B, a user may select (via a touch selection, voice command, visual instruction such as nodding or blinking when using Augmented Reality of Virtual Reality devices, a motion of the client device, or any other method that conveys a selection) a button on the user interface to enter a concept. In response to the selection of the button (for example, button 204), a keyboard may be displayed allowing the user to enter a concept that the user believes relates to a frame of the live video stream 208. Although a keyboard is illustrated in FIG. 3B, it should be understood that the user may enter a concept via other methods (for example, voice command, visual instruction such as nodding or blinking when using Augmented Reality of Virtual Reality devices, a motion of the client device, or any other method that conveys an input). In the example illustrated in FIG. 3B, the user enters a concept "Clairebot." Based on such a user input (i.e., "Clairebot"), the client device 104 may generate an association between the current frame of the live video stream 208 and the concept "Clairebot" (for example, the current frame of the live video stream 208 may be annotated with the concept "Clairebot"), temporarily store the generated association in a memory (not shown) of the client device 104, and transmit the generated association to the server 102 to train a prediction model. Alternatively, as noted above, the user selection may be transmitted to the server 102 so that the server 102 may generate the association. The generated association between the frames of the live video stream 208 and the concept "Clairebot" may be processed, via a prediction model, by the server 102 (for example, by the model subsystem 114) to train the prediction model to make future predictions relating to other live video streams and other frames of the current live video stream 208.

In response to the user input of the concept "Clairebot" relating to a frame of the live video stream 208, the user interface displays "Clairebot" as a high-confidence predicted concept 302 in an example illustrated in FIG. 3C. In some embodiments, a plurality of high-confidence predicted concepts 302 (for example, "Claire" and "Clairebot" in FIG. 3C) may be displayed on a user interface of the client device 104.

Next, when the camera of the client device 104 is moved away to point in a different direction (as illustrated in FIG. 3D), the display of the high-confidence predicted concepts 302 disappears because the concepts "Claire" and "Clairebot" no longer appear to be related to the current frame of the live video stream 208 in FIG. 3D. However, when the camera of the client device 104 is moved back to a position illustrated in FIG. 3C, the high-confidence predicted concepts 302 (i.e., Claire" and "Clairebot") are displayed again on the user interface of the client device 104. This way, a user may distinguish between concepts (relating to the current frame of the live video stream 208) that have a high confidence level and other concepts (relating to the current frame of the live video stream 208) that have a lower confidence level. In FIGS. 3A, 3C, and 3D, the predicted concepts 202 are displayed and are continuously being changed and updated. The description regarding the predicted concepts 202 is provided above and therefore, not repeated for the sake of brevity.

Alternatively, although the above examples in FIGS. 3A-3D have been illustrated to include a plurality of displayed concepts 202 (and buttons corresponding to each of the plurality of concepts) and buttons 204 and 206, in some embodiments, the user interface may include a single button that represents a concept, and the user may utilize the single button to perform all the functions described above with regard to FIGS. 3A-3D.

Example Flowchart

Figure 4:
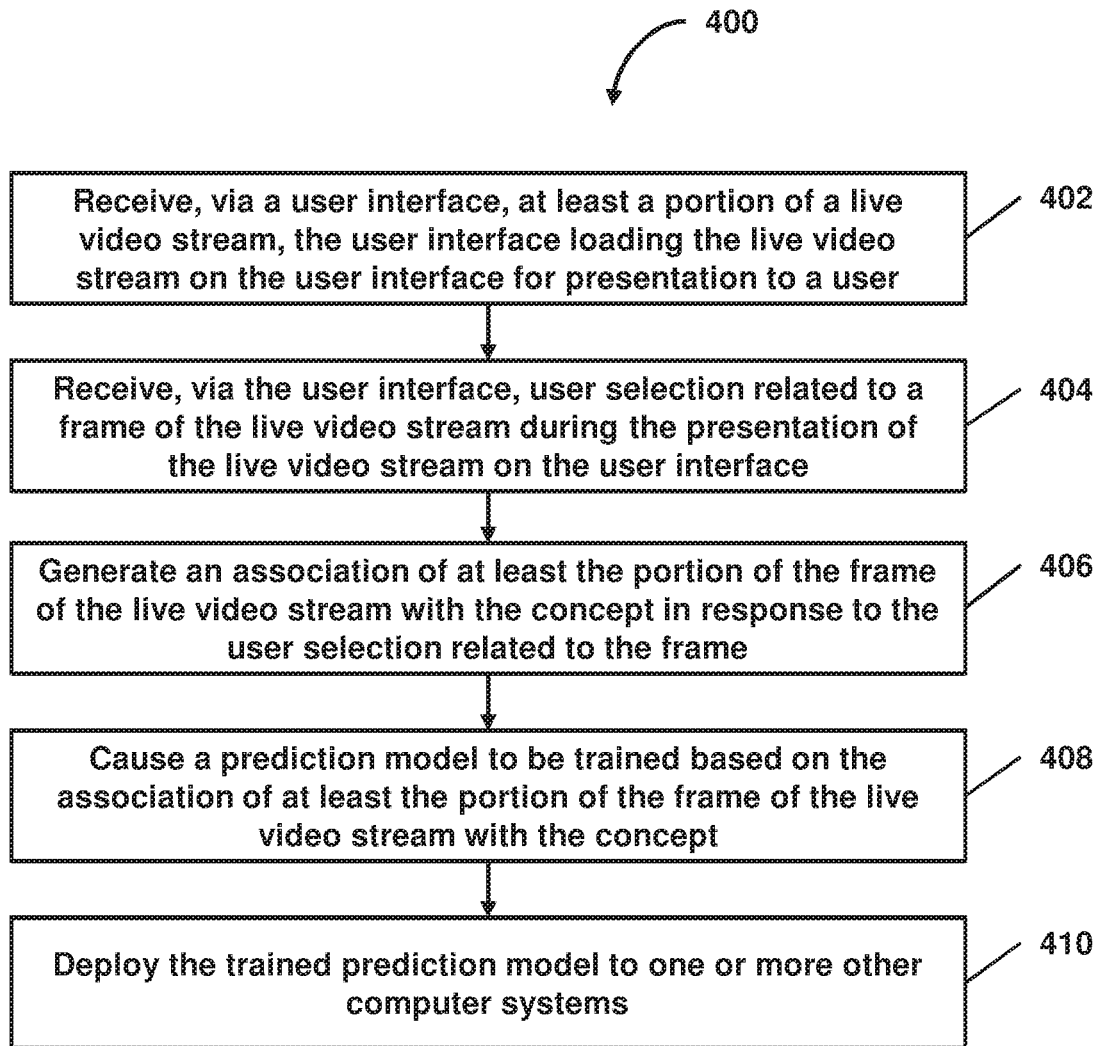
FIG. 4 illustrates an example flowchart describing a method for training a prediction model via live stream concept association, in accordance with one or more embodiments.

FIG. 4 illustrates an example flowchart 400 describing a method for training a prediction model via live stream concept association. The processing operations of the method presented below are intended to be illustrative and non-limiting. In some embodiments, for example, the method may be accomplished with one or more additional operations not described, and/or without one or more of the operations discussed. Additionally, the order in which the processing operations of the method are illustrated (and described below) is not intended to be limiting.

In some embodiments, the method may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the method in response to instructions stored electronically on an electronic storage medium. The processing devices may include one or more devices configured through hardware, firmware, and/or software to be specifically designed for execution of one or more of the operations of the method.

In step 402, at least a portion of a live video stream may be received via a user interface. As an example, the live video stream may be loaded on the user interface, such as a user interface of an application hosted at the client device, a web interface of an application hosted at one or more service platforms, or other user interface. The live video stream loaded on the user interface may be received from a camera of the client device, a remote camera (e.g., a security camera, a drone camera, a digital satellite camera, etc., remote from the client device), or one or more other sources. In some embodiments, one or more sets of concepts may be caused to be displayed on the user interface along with the live video stream during the presentation of the video stream. As an example, in response to the loading the live video stream, one or more portions of the live video stream may be transmitted to one or more servers (e.g., server 102) for processing the live video stream (or portions thereof) via a prediction model to predict concepts (that are related to the live video stream) to be displayed on the user interface of the client device. Once the predicted concepts are determined (e.g., by the server 102), the predicted concepts may be transmitted to the client device so that the client device may display the predicted concepts along with the live video stream (see e.g., FIGS. 2A and 2B). In some embodiments, the user interface may display the live video stream along with a button (or other user interface item) that corresponds to a concept (which may be predicted by the prediction subsystem 112 or entered by the user of the client device). As an example, the user interface may be configured such that user selection of the button (corresponding to the concept) during a time at which a given frame (or a portion of a frame) of the live video stream is being presented may cause the client device to transmit an indication (e.g., to the server 102) that the given frame (or the portion of the frame) includes the concept.

In step 404, a user selection related to a frame of the live video stream may be received via the user interface. As an example, a client device's application (e.g., to which the user interface corresponds) may receive the user selection, and provide the user selection to a server during the presentation of the live video stream on the user interface. The user selection may correspond to a selection of one or more concepts displayed on the user interface (e.g., predicted as concepts likely to exist in the live video stream), a selection of a button corresponding to a concept, or other user input indicating a concept.

In step 406, in response to a user selection, an association between at least the frame of the live video stream and the concept indicated in the user selection may be generated (e.g., by the client device, the server, etc.). In step 408, based on the generated association, a prediction model is caused to be trained. As an example, the generated association may be provided as training data to the prediction model to cause the prediction model to be trained based on the generated association. In this way, for example, the prediction model may improve its future predictions relating to other live video streams or other frames of the current live video stream.

Further, in step 410, the trained prediction model may be deployed to one or more other computer systems. As an example, the trained prediction model may be deployed to one or more other client devices, servers, or other components of system 100 via the Internet (or other network) so that these other client devices or servers may use the trained prediction model to process other live video streams and generate predictions relating to the other live video streams.

In some embodiments, the various computers and subsystems illustrated in FIG. 1 may include one or more computing devices that are programmed to perform the functions described herein. The computing devices may include one or more electronic storages (e.g., prediction database(s) 132, which may include training data database(s) 134, recognition model database(s) 136, etc., or other electric storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 described herein is for illustrative purposes, and is not intended to be limiting, as any of subsystems 112-118 may provide more or less functionality than is described. For example, one or more of subsystems 112-118 may be eliminated, and some or all of its functionality may be provided by other ones of subsystems 112-118. As another example, additional subsystems may be programmed to perform some or all of the functionality attributed herein to one of subsystems 112-118.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

The present techniques will be better understood with reference to the following enumerated embodiments:

1. A method comprising: receiving, via a user interface, at least a portion of a live video stream, the user interface loading the live video stream on the user interface for presentation to a user; receiving, via the user interface, a user selection related to a frame of the live video stream during the presentation of the live video stream on the user interface, the user selection indicating a presence of a concept in the frame of the live video stream; and determining an association of at least a portion of the frame of the live video stream with the concept responsive to the user selection related to the frame, wherein a neural network is trained based on the association of at least the portion of the frame with the concept.

2. The method of embodiment 1, wherein an absence of at least one user selection related to another frame of the live video stream during the presentation of the live video stream on the user interface indicates an absence of the concept in the other frame of the live video stream, and the neural network is trained based on the absence of the at least one user selection.

3. The method of any of embodiments 1 and 2, further comprising: receiving, via the user interface, another user selection related to another frame of the live video stream during the presentation of the live video stream on the user interface, the other user selection indicating a presence of the concept in the other frame of the live video stream, and determining an association of at least a portion of the other frame of the live video stream with the concept responsive to the other user selection related to the other frame, wherein the neural network is trained based on the association of at least the portion of the other frame with the concept.

4. The method of any of embodiments 1-3, further comprising: receiving, via the user interface, another user selection related to another frame of the live video stream during the presentation of the live video stream on the user interface, the other user selection indicating a presence of another concept in the other frame of the live video stream, and determining an association of at least a portion of the other frame of the live video stream with the other concept responsive to the other user selection related to the other frame, wherein the neural network is trained based on the association of at least the portion of the other frame with the other concept.

5. The method of any of embodiments 1-4, further comprising: determining a pressure level applied by the user on the user interface during the user selection related to the frame, and determining a confidence value for the presence of the concept in the frame of the live video stream based on the determined pressure level, wherein the neural network is trained based on the determined confidence value.

6. The method of embodiment 5, wherein the confidence value is directly proportional to the pressure level.

7. The method of any of embodiments 1-6, wherein the user selection is based on at least one of a voice instruction from the user, a visual instruction from the user, or a touch instruction from the user.

8. The method of any of embodiments 1-7, further comprising: receiving, via the user interface, another user instruction to rewind the live video stream to supplement or modify the association of at least the portion of the frame with the concept; receiving, via the user interface, a subsequent user selection related to the frame of the live video stream, the subsequent user selection indicating a presence of another concept in the frame of the live video stream; and determining an association of at least the portion of the frame of the live video stream with the other concept responsive to the subsequent user selection related to the frame, wherein the neural network is trained based on the association of at least the portion of the frame with the other concept.

9. The method of any of embodiments 1-8, further comprising: transmitting the trained neural network to another system to allow the other system to predict concepts relating to another live video stream.

10. The method of any of embodiments 1-9, further comprising: capturing the live video stream.

11. The method of any of embodiments 1-10, further comprising: receiving, via the user interface, at least a portion of a frame of another live video stream, the user interface loading the other live video stream for presentation to a user; predicting a concept in the frame in the other live video stream based on the trained neural network; and causing the predicted concept to be displayed on the user interface during the presentation of the other live video stream.

12. The method of any of embodiments 1-11, further comprising: processing, via the neural network, one or more portions of the live video stream to generate a set of predicted concepts, the set of predicted concepts comprising one or more predicted concepts; and causing the one or more predicted concepts to be displayed on the user interface during the presentation of the live video stream, wherein receiving the user selection related to the frame comprises receiving the user selection of the concept from among the one or more predicted concepts.

13. The method of embodiment 12, further comprising: dynamically updating the set of predicted concepts displayed on the user interface.

14. The method of any of embodiments 1-13, further comprising: receiving the user selection via a button displayed on the user interface, the button corresponding to the concept.

15. A method comprising: receiving, via a user interface, at least a portion of a live video stream, the user interface loading the live video stream on the user interface for presentation to a user; receiving, via the user interface, a user selection related to a frame of the live video stream during the presentation of the live video stream on the user interface, the user selection indicating a presence of a concept in the frame of the live video stream; and determining an association of at least a portion of the frame of the live video stream with the concept responsive to the user selection related to the frame, wherein a prediction model is trained based on the association of at least the portion of the frame with the concept.

16. The method of embodiment 15, wherein an absence of at least one user selection related to another frame of the live video stream during the presentation of the live video stream on the user interface indicates an absence of the concept in the other frame of the live video stream, and the prediction model is trained based on the absence of the at least one user selection.

17. The method of any of embodiments 15 and 16, further comprising: receiving, via the user interface, another user selection related to another frame of the live video stream during the presentation of the live video stream on the user interface, the other user selection indicating a presence of the concept in the other frame of the live video stream, and determining an association of at least a portion of the other frame of the live video stream with the concept responsive to the other user selection related to the other frame, wherein the prediction model is trained based on the association of at least the portion of the other frame with the concept.

18. The method of any of embodiments 15-17, further comprising: receiving, via the user interface, another user selection related to another frame of the live video stream during the presentation of the live video stream on the user interface, the other user selection indicating a presence of another concept in the other frame of the live video stream, and determining an association of at least a portion of the other frame of the live video stream with the other concept responsive to the other user selection related to the other frame, wherein the prediction model is trained based on the association of at least the portion of the other frame with the other concept.

19. The method of any of embodiments 15-18, further comprising: determining a pressure level applied by the user on the user interface during the user selection related to the frame, and determining a confidence value for the presence of the concept in the frame of the live video stream based on the determined pressure level, wherein the prediction model is trained based on the determined confidence value.

20. The method of embodiment 19, wherein the confidence value is directly proportional to the pressure level.

21. The method of any of embodiments 15-20, wherein the user selection is based on at least one of a voice instruction from the user, a visual instruction from the user, or a touch instruction from the user.

22. The method of any of embodiments 15-21, further comprising: receiving, via the user interface, another user instruction to rewind the live video stream to supplement or modify the association of at least the portion of the frame with the concept; receiving, via the user interface, a subsequent user selection related to the frame of the live video stream, the subsequent user selection indicating a presence of another concept in the frame of the live video stream; and determining an association of at least the portion of the frame of the live video stream with the other concept responsive to the subsequent user selection related to the frame, wherein the prediction model is trained based on the association of at least the portion of the frame with the other concept.

23. The method of any of embodiments 15-22, further comprising: transmitting the trained prediction model to another system to allow the other system to predict concepts relating to another live video stream.

24. The method of any of embodiments 15-23, further comprising: capturing the live video stream.

25. The method of any of embodiments 15-24, further comprising: receiving, via the user interface, at least a portion of a frame of another live video stream, the user interface loading the other live video stream for presentation to a user; predicting a concept in the frame in the other live video stream based on the trained prediction model; and causing the predicted concept to be displayed on the user interface during the presentation of the other live video stream.

26. The method of any of embodiments 15-25, further comprising: processing, via the prediction model, one or more portions of the live video stream to generate a set of predicted concepts, the set of predicted concepts comprising one or more predicted concepts; and causing the one or more predicted concepts to be displayed on the user interface during the presentation of the live video stream, wherein receiving the user selection related to the frame comprises receiving the user selection of the concept from among the one or more predicted concepts.

27. The method of embodiment 26, further comprising: dynamically updating the set of predicted concepts displayed on the user interface.

28. The method of any of embodiments 15-27, further comprising: receiving the user selection via a button displayed on the user interface, the button corresponding to the concept.

29. A tangible, non-transitory, machine-readable medium storing instructions that when executed by a data processing apparatus cause the data processing apparatus to perform operations comprising those of any of embodiments 1-28.

30. A system, comprising: one or more processors; and memory storing instructions that when executed by the processors cause the processors to effectuate operations comprising those of any of embodiments 1-28.

What is claimed is:

1. A system for training a prediction model via association of a concept with a video stream, the system comprising:
a computer system that comprises one or more processors programmed with computer program instructions that, when executed, cause the computer system to:
obtain a video stream;
process, via a prediction model, the video stream to generate a plurality of predicted concepts relating to the video stream;
cause the plurality of predicted concepts to be presented via a user interface during presentation of the video stream via the user interface;
obtain a selection of a concept related to a frame of the video stream, the selection of the concept being from among the plurality of predicted concepts and including moving the concept over a portion of the frame of the video stream presented via the user interface;
determine an association between the portion of the frame of the video stream and the concept; and
train the prediction model based on the association between the portion of the frame of the video stream and the concept.

2. The system of claim 1, wherein the computer system is caused to:
determine a pressure level applied by a user on the user interface during the selection related to the frame of the video stream;
determine a confidence value for a presence of the concept in the frame of the video stream based on the determined pressure level; and
train the prediction model based on the determined confidence value.

3. The system of claim 2, wherein the confidence value is directly proportional to the pressure level.

4. The system of claim 1, wherein the selection is a user selection and the user selection is based on at least one of a voice instruction from a user, a visual instruction from the user, or a touch instruction from the user.

5. The system of claim 1, wherein the computer system is caused to:
obtain metadata related to another frame of the video stream, the metadata describing another concept in the another frame of the video stream;
determine another association between the another frame and the metadata; and
train the prediction model based on the another association between the another frame and the metadata.

6. The system of claim 1,
wherein the plurality of predicted concepts include a first set of predicted concepts and a second set of predicted concepts,
wherein the first set of predicted concepts are associated with first confidence values equal to or higher than a confidence threshold and the second set of predicted concepts are associated with second confidence values less than the confidence threshold, and
wherein the first and second confidence values indicate a confidence level that a particular predicted concept is present in a particular frame of the video stream.

7. The system of claim 6, wherein the first set of predicted concepts and the second set of predicted concepts are presented via the user interface such that the first set of predicted concepts and the second set of predicted concepts are distinguished from each other.

8. A method comprising:
obtaining a video stream;
processing, via a prediction model, the video stream to generate a plurality of predicted concepts relating to the video stream;
causing the plurality of predicted concepts to be presented via a user interface during presentation of the video stream via the user interface;
obtaining a selection of a concept related to a frame of the video stream, the selection of the concept being from among the plurality of predicted concepts and including moving the concept over a portion of the frame of the video stream presented via the user interface;
determining an association between the portion of the frame of the video stream and the concept; and
training the prediction model based on the association between the portion of the frame of the video stream and the concept.

9. The method of claim 8, further comprising:
determining a pressure level applied by a user on the user interface during the selection related to the frame of the video stream;
determining a confidence value for a presence of the concept in the frame of the video stream based on the determined pressure level; and
training the prediction model based on the determined confidence value.

10. The method of claim 9, wherein the confidence value is directly proportional to the pressure level.

11. The method of claim 8, wherein the selection is a user selection and the user selection is based on at least one of a voice instruction from a user, a visual instruction from the user, or a touch instruction from the user.

12. The method of claim 8, further comprising:
obtaining metadata related to another frame of the video stream, the metadata describing another concept in the another frame of the video stream;
determining another association between the another frame and the metadata; and
training the prediction model based on the another association between the another frame and the metadata.

13. The method of claim 8,
wherein the plurality of predicted concepts include a first set of predicted concepts and a second set of predicted concepts,
wherein the first set of predicted concepts are associated with first confidence values equal to or higher than a confidence threshold and the second set of predicted concepts are associated with second confidence values less than the confidence threshold, and
wherein the first and second confidence values indicate a confidence level that a particular predicted concept is present in a particular frame of the video stream.

14. The method of claim 13, wherein the first set of predicted concepts and the second set of predicted concepts are presented via the user interface such that the first set of predicted concepts and the second set of predicted concepts are distinguished from each other.

15. One or more non-transitory, computer-readable media storing instructions that, when executed by one or more processors, effectuate operations comprising:
obtaining a video stream;

processing, via a prediction model, the video stream to generate a plurality of predicted concepts relating to the video stream;

causing the plurality of predicted concepts to be presented via a user interface during presentation of the video stream via the user interface;

obtaining a selection of a concept related to a frame of the video stream, the selection of the concept being from among the plurality of predicted concepts and including moving the concept over a portion of the frame of the video stream presented via the user interface;

determining an association between the portion of the frame of the video stream and the concept; and training the prediction model based on the association between the portion of the frame of the video stream and the concept.

16. The non-transitory, computer-readable media of claim 15, further comprising:

determining a pressure level applied by a user on the user interface during the selection related to the frame of the video stream;

determining a confidence value for a presence of the concept in the frame of the video stream based on the determined pressure level; and training the prediction model based on the determined confidence value.

17. The non-transitory, computer-readable media of claim 16, wherein the confidence value is directly proportional to the pressure level.

18. The non-transitory, computer-readable media of claim 15, wherein the selection is a user selection and the user selection is based on at least one of a voice instruction from a user, a visual instruction from the user, or a touch instruction from the user.

19. The non-transitory, computer-readable media of claim 15, further comprising: obtaining metadata related to another frame of the video stream, the metadata describing another concept in the another frame of the video stream;

determining another association between the another frame and the metadata; and training the prediction model based on the another association between the another frame and the metadata.

20. The non-transitory, computer-readable media of claim 15, wherein the plurality of predicted concepts include a first set of predicted concepts and a second set of predicted concepts, wherein the first set of predicted concepts are associated with first confidence values equal to or higher than a confidence threshold and the second set of predicted concepts are associated with second confidence values less than the confidence threshold, wherein the first and second confidence values indicate a confidence level that a particular predicted concept is present in a particular frame of the video stream, and wherein the first set of predicted concepts and the second set of predicted concepts are presented via the user interface such that the first set of predicted concepts and the second set of predicted concepts are distinguished from each other.

* * * * *